United States Patent Office 2,826,614
Patented Mar. 11, 1958

2,826,614

PRODUCTION OF ACETYLENIC HYDROXY COMPOUNDS CATALYZED BY QUATERNARY AMMONIUM HYDROXIDE ANION EXCHANGE RESIN

Gordon Howard Whitfield, Norton-on-Tees, England, assignor to Imperial Chemical Industries Limited, a corporation of Great Britain No Drawing. Application June 18, 1953
Serial No. 362,660

Claims priority, application Great Britain July 21, 1952

8 Claims. (Cl. 260—635)

This invention relates to the production of acetylenic hydroxy compounds.

It is already known to produce potassium derivatives of 2-methylbut-3-yne-2-ol and 2,5-dimethylhex-3-yne-2,5-diol by condensing acetone with acetylene in the presence of potassium hydroxide or a potassium alkoxide and in the substantial absence of water. Free 2-methylbut-3-yne-2-ol and 2,5-dimethylhex-3-yne-2,5-diol may then be liberated from the potassium derivatives, by treatment, for example, with water or with an acid, such as a mineral acid or an organic acid, or by treatment with carbon dioxide. The disadvantage of this process is that a substantial amount of potassium hydroxide or a potassium alkoxide is employed in the condensation reaction, and, when operating according to the method described above, this hydroxide or alkoxide is difficult to recover in a form suitable for re-use.

We have now found a process for condensing together acetylene and a ketone such as acetone, which does not necessitate the use of substantial amounts of potassium hydroxide or alkoxide. According to the present invention there is provided a process for the production of acetylenic hydroxy compounds which comprises the step of reacting acetylene with a ketone in the presence of a quaternary ammonium hydroxide anion exchange resin, the reaction being carried out at a temperature in the range of 40° to 120° C. and at an elevated acetylene pressure within the range of 1 atmosphere to 30 atmospheres gauge.

Quaternary ammonium hydroxide anion exchange resins suitable for use in the process of the present invention are those in which each nitrogen atom is attached to three alkyl groups and to a methylene group, the methylene group being attached to a monocyclic aromatic group which is a constituent part of a cross-linked organic polymer.

A particularly suitable anion exchange resin is one in which the nitrogen atom is attached to three methyl groups and a methylene group, the methylene group being attached to the phenyl group of a poly-styrene resin.

Commercially available exchange resins which may be used in the process of the present invention are those sold under the registered trademarks "Amberlite Ira 400 (OH)" and "Amberlite Ira 410 (OH)" the former being particularly preferred.

When, for example, acetone is used as the starting material in the process of the present invention, 2-methylbut-3-yne-2-ol or a mixture comprising 2-methylbut-3-yne-2-ol and 2,5-dimethylhex-3-yne-2,5-diol is produced. When using methyl ethyl ketone as the starting material, the major product is 3-methylpent-4-yne-3-ol.

2,5-dimethylhex-3-yne-2,5-diol is an important product of the process of the present invention, since this may be converted in good yield to para-xylene. 2,5-dimethylhex-3-yne-2,5-diol may be produced by heating together acetone and acetylene under an elevated acetylenic pressure of for example, 10 to 30 atmospheres gauge, in the presence of a quaternary ammonium hydroxide anion exchange resin, preferably that sold under the registered trademark "Amberlite Ira 400 (OH)." From the reaction product, unchanged acetone and 2-methylbut-3-yne-2-ol produced may be separated and returned to the reaction vessel in which further quantities of acetone and acetylene are reacted. The separation of acetone and 2-methylbut-3-yne-2-ol from the reaction mixture may be effected, for example, by distillation.

If desired, the reaction may be carried out in two stages; in the first stage, acetone and acetylene are reacted together, in the presence of anion exchange resin, at an elevated pressure, and at an elevated temperature within the range of 40° to 120° C. whereby there is obtained a product comprising 2-methylbut-3-yne-2-ol and 2,5-dimethylhex-3-yne-2,5-diol. This product is then reacted in a second stage with a further quantity of acetone, again in the presence of the anion exchange resin. This second stage is conveniently carried out at a temperature and pressure similar to those employed in the first stage.

The condensation of a carbonyl compound with acetylene, according to the process of the present invention, is carried out at an elevated acetylene pressure within the range of 1 to 30 atmospheres gauge, and preferably at a pressure within the range of 10 to 30 atmospheres gauge. If desired, the acetylene employed in the process of the present invention may be diluted with an inert gas, preferably nitrogen. For example, a mixture having a nitrogen:acetylene volume ratio of 1:4 may be employed.

It should be understood that in carrying out the process of the present invention, the conditions of operation shall not contravene those laid down in Statutory Rules and Orders, 1947, No. 805; Explosive Substance; The Compressed Acetylene Order.

*Example 1*

440 grams of acetone and 200 grams of the anion exchange resin sold under the registered trademark "Amberlite Ira 400 (OH)" were heated together at 80° C. for 7½ hours under a pressure of 4.4 atmospheres of nitrogen and 17.6 atmospheres of acetylene. The pressure was maintained at a total of 22 atmospheres throughout the reaction period by continuously introducing fresh acetylene. The product was filtered, dried and distilled. 248 grams of acetone were recovered. 97.5 grams of 2-methylbut-3-yne-2-ol boiling at 102° to 108° C. and 30.5 grams of 2,5-dimethylhex-3-yne-2,5-diol were isolated. The latter was purified by recrystallisation from carbon tetrachloride; 21 grams of pure 2,5-dimethylhex-3-yne-2,5-diol, having a melting point of 94°–95° C., were obtained in this way.

From the condensation product obtained in this reaction 15 grams of acetone self-condensation products were obtained. This amount consisted largely of mesityl oxide and di-acetone alcohol, together with a trace of phorone.

*Example 2*

400 grams of methyl ethyl ketone and 195 grams of the anion exchange resin sold under the registered trademark "Amberlite Ira 400 (OH)" were heated together for 6½ hours at 60° C. under a pressure of 4.6 atmospheres of nitrogen and 18.4 atmospheres of acetylene. The product was cooled and filtered. The residue was washed with ether, and the ether washings bulked with the filtrate, which was then fractionally distilled. The fractions obtained comprised unchanged methyl ethyl ketone (298 grams), an intermediate fraction, B. P. 82°–110° C. (11.1 grams), 3-methylpent-4-yne-3-ol, B. P. 120°–122° C. (95 grams), and a residue (7.0 grams) boiling at above 122° C.

I claim:

1. A process for the production of acetylenic hydroxy compounds, which comprises the step of reacting acetylene with a ketone in the presence of a quaternary ammonium hydroxide anion exchange resin, the reaction being carried out at a temperature within the range of 40° to 120° C. and at an elevated acetylene pressure of 1 to 30 atmospheres gauge.

2. A process as claimed in claim 1 in which the quaternary ammonium hydroxide anion exchange resin is one in which each nitrogen atom is attached to three alkyl groups and to a methylene group, the methylene group being attached to a monocyclic aromatic group which is a constituent part of a cross linked organic polymer.

3. A process as claimed in claim 1 in which the quaternary ammonium hydroxide anion exchange resin is one in which the nitrogen atom is attached to three methyl groups and a methylene group, the methylene group being attached to the phenyl group of a poly-styrene resin.

4. A process for the production of acetylenic hydroxy compounds which comprises the step of reacting acetylene with a ketone in the presence of a quaternary ammonium hydroxide anion exchange resin, the reaction being carried out at a temperature within the range 40° to 120° C. and at an elevated acetylene pressure of 10 to 30 atmospheres gauge.

5. A process for the production of at least one acetylenic hydroxy compound selected from the group consisting of 2-methylbut-3-yne-2-ol and 2,5-dimethylhex-3-yne-2,5-diol which comprises the step of reacting acetylene with acetone in the presence of a quaternary ammonium hydroxide anion exchange resin, the reaction being carried out at a temperature within the range of 40° to 120° C. and at an elevated acetylene pressure of 1 to 30 atmospheres gauge.

6. A process as claimed in claim 5 in which the quaternary ammonium hydroxide anion exchange resin is one in which each nitrogen atom is attached to three alkyl groups and to a methylene group, the methylene group being attached to a monocyclic aromatic group which is a constituent part of a cross-linked organic polymer.

7. A process as claimed in claim 5 in which the quaternary ammonium hydroxide anion exchange resin is one in which the nitrogen atom is attached to three methyl groups and a methylene group, the methylene group being attached to the phenyl group of a poly-styrene resin.

8. A process for the production of a mixture comprising 3-methylpent-4-yne-3-ol which comprises the step of reacting acetylene with methyl ethyl ketone in the presence of a quaternary ammonium hydroxide anion exchange resin, the reaction being carried out at a temperature within the range of 40° to 120° C. and at an elevated acetylene pressure of 1 to 30 atmospheres gauge.

References Cited in the file of this patent

UNITED STATES PATENTS

| 2,163,720 | Vaughn | June 27, 1939 |
| 2,302,345 | Pesta et al. | Nov. 17, 1942 |
| 2,364,925 | Spurlin | Dec. 12, 1944 |
| 2,591,573 | McBurney | Apr. 1, 1952 |

OTHER REFERENCES

Rohm and Haas: The Resinous Reporter, vol. IX, No. 4 (July 1948), pp. 9–13.

Galat: JACS, vol. 70, 3945 (1948).

Amber Hi Lites Report No. 4, received in Patent Office Apr. 22, 1951. Publication of Rohm and Haas Co., Washington Square, Philadelphia.

Samuelson: Ion Exchange in Analytical Chemistry, Wiley and Sons, New York, 1953; pp. 25 and 26.